June 24, 1947.   R. H. FREDRICKSON ET AL   2,422,665
CEMENTITIOUS SURFACE COVERING
Filed Aug. 18, 1943
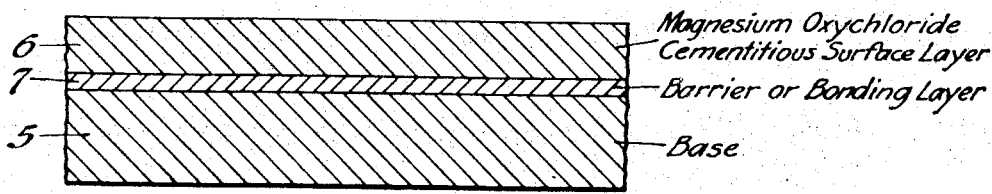
Inventors
Russell H. Fredrickson
Henry N. Stephens
By Carpenter Abbott Coulter & Kinney
Attorneys Patented June 24, 1947

2,422,665

UNITED STATES PATENT OFFICE 2,422,665

CEMENTITIOUS SURFACE COVERING

Russell H. Fredrickson, Minneapolis, and Henry N. Stephens, White Bear Lake, Minn., assignors to Minnesota Mining & Manufacturing Company, St. Paul, Minn., a corporation of Delaware Application August 18, 1943, Serial No. 499,084

1 Claim. (Cl. 94—19)

This invention relates to cementitious surface covering. More particularly, it concerns an improved barrier and bonding layer for use with a magnesium oxychloride cementitious wearing surface for floors, walls, ceilings, and the like, and method of construction.

Magnesium oxychloride cements, since being first described by Sorel, a French chemist in 1876, have been subject to considerable investigation, not only because of their many outstanding useful qualities, such as, great strength, high resilience, etc., but because of their shortcomings which have restricted their use. Probably the greatest limitations upon their use have been imposed by (1) their solubility and (2) their excessive volume change. The efforts to minimize these disadvantages have resulted in the production of an improved magnesium oxychloride cement which is described in the copending application of William E. Sohl and Henry N. Stephens, Serial Number 297,502, filed October 2, 1939, now Patent No. 2,351,641.

A common method of constructing a magnesium oxychloride cementitious surface covering is to form in situ the magnesium oxychloride surface layer on an underlying base surface. When Portland cement is used as the base surface, however, the soluble alkali present in the base surface reacts chemically with the magnesium oxychloride cementitious material at the interface and causes it to deteriorate and crumble.

Heretofore, it has been proposed to form an intermediate layer of a rubber film, preferably a latex emulsion, between the base surface and the magnesium oxychloride wearing surface to bond the forming film of magnesium oxychloride cement to the base layer. The use of latex, or other rubber film, however, for this purpose is generally restricted because of many disadvantages, such as:

(1) Upon aging the rubber film oxidizes to a semi-liquid before finally resinifying and during the semi-liquid stage it loses all its strength, which results in a weakening of the bond.

(2) The oil resistance of the rubber film is poor; consequently, when the wearing surface is exposed to oil which can penetrate the magnesium oxychloride cement and attack the rubber film, the bond is destroyed.

(3) The adhesiveness of rubber film is relatively poor; and, when the bond is broken, separation takes place between the surface of the latex or rubber film and the magnesium oxychloride cement.

(4) Latex is entirely unsatisfactory for use with a common type of oxychloride composition containing finely divided copper, such as "Hubbellite" developed by Dean S. Hubbell. The presence of copper accelerates the degradation of the rubber film so that the latter is destroyed within a relatively short time.

Reclaimed rubber compositions which have been used as the intermediate layer are superior to latex in aging characteristics because on oxidation the product does not become liquid, but these compositions still have the disadvantage of poor oil resistance, etc.

We have now found a method of constructing magnesium oxychloride surfaced cement floors, walls, ceilings, etc., which is an improvement over those known to the art. This method consists generally of applying an aqueous dispersion of a soft, petroleum insoluble synthetic elastomer as a barrier or bonding layer between the base surface and the magnesium oxychloride cementitious wearing surface. We have found that the soft synthetic elastomers of our invention possess many highly desirous properties different than and superior to rubber or reclaimed rubber films, such as are deposited from natural latex or artificial dispersion, when used as a barrier and bonding layer between a Portland cement base surface and a magnesium oxychloride cementitious wearing surface. For example, in accordance with our invention, the soft synthetic elastomers have a substantially higher resistance to loss of strength upon aging than latex or rubber; they are substantially petroleum hydrocarbon insoluble, i. e. oil-resistant; they possess surface tackiness which increases their adhesive properties; and they are not affected by copper.

Accordingly, it is an object of this invention to provide an improved barrier or bonding layer for use with a magnesium oxychloride cementitious wearing surface for floors, walls, ceilings, and the like, which is substantially resistant to loss of strength upon aging; which is substantially petroleum hydrocarbon insoluble; which has good surface tackiness and thus good adhesion; and which can be used with various types of magnesium oxychloride cement, including those containing copper. Another object is to provide a barrier or bonding layer between a Portland cement base surface and a magnesium oxychloride cementitious wearing surface which will effectively prevent the migration of soluble alkali present in the Portland cement to the magnesium oxychloride cement. Another object is to prevent porous base surfaces, such as wood and the like from absorbing the magnesium chloride solution and thus weakening the cement. Further objects will be apparent from the specification and claims as a whole.

Now, in accordance with this invention, a cement floor or the like is constructed which is comprised of a substantially continuous base surface, a prime coat of a soft synthetic elastomer, and a magnesium oxychloride cementitious wearing surface, the prime coat forming a barrier and bonding layer between the base and wearing surfaces. The barrier and bonding layer is characterized by being substantially resistant to loss of strength upon aging, and by being substantially petroleum hydrocarbon insoluble, i. e. oil-resistant. Employing the method of this invention, a cement floor or the like may be constructed by applying an aqueous dispersion of a soft, petroleum insoluble synthetic elastomer as a prime coat, i. e. a barrier and bonding layer, to a substantially continuous base surface, preferably of Portland cement, and then dispersing a plastic mass of magnesium oxychloride cementitious wearing surface over the prime coat, which plastic mass hardens to form a strong wearing surface. Our invention, however, is not limited to the application of the soft, synthetic elastomer in aqueous dispersion. Solutions of the elastomer may be used, if so desired, although solutions are not preferred because of the vapor nuisance or hazard during evaporation, and in addition poorer bonding results.

Referring to the drawing, the single figure shows a vertical sectional view of the cement floor or the like of my invention.

A base 5 may be of any suitable material such as concrete, stonework, brickwork, steel, wood, composition, and the like. However, a Portland cement base is preferred.

A magnesium oxychloride cementitious layer 6 forming the wearing surface may be of any of the well known types of magnesium oxychloride or Sorel cements. However, the improved magnesium oxychloride cement disclosed in the copending application of William E. Sohl and Henry N. Stephens, hereinbefore referred to has been found particularly suitable for use in my invention.

The barrier and bonding layer 7, i. e. prime coat, is composed of a soft synthetic elastomer which may be applied to the base 5 by means of spraying, brushing, etc. Suitable elastomers must possess the following characteristics.

(1) They must be substantially resistant to loss of strength upon aging.

(2) They must be substantially petroleum hydrocarbon insoluble, i. e. oil-resistant.

(3) They must be soft. By the term "soft" as used herein is meant that the synthetic elastomer is soft enough that it will flow together when laid down from an aqueous dispersion at room temperature so that it will be a continuous film, rather than a mass of discrete particles, yet firm enough to make a tough film.

(4) They must be unaffected by presence of copper.

Now, having indicated in a general way, the nature and purposes of this invention, the following specific example will illustrate the invention. It is to be understood, however, that such example is presented merely as illustrating the invention and is not to be construed as limiting the same. In the example the ingredients are given in parts by weight, unless otherwise indicated.

*Preparation of a soft synthetic elastomer comprising methyl acrylate-ethyl acrylate*

| | Parts |
|---|---|
| Water | 1000 |
| Duponol ME (an alcohol sulfate sold by E. I. du Pont de Nemours Co.) | 5 |
| Ammonium persulfate | 3 |
| Ammonium hydroxide 28% | 5 |
| Ethyl acrylate | 300 |
| Methyl acrylate | 300 |

The water, persulfate, Duponol and ammonium hydroxide were placed in a flask together with 200 parts of a mixture of equal parts of methyl acrylate-ethyl acrylate monomers. The reaction mixture was heated to reflux and maintained at reflux by the gradual addition of the balance of the monomers admixed together. The total time of polymerization was about 2 hours. To the latex formed, a small amount of ammonium hydroxide was added sufficient to make the solution very slightly basic. The soft, petroleum insoluble synthetic elastomer was then ready for use as a prime coat, i. e. barrier and bonding layer, and consisted of an aqueous emulsion of a 50/50 methyl acrylate-ethyl acrylate copolymer with a solids content of approximately 40%.

The proportions of the monomers used in the preparation of suitable interpolymers of methyl acrylate and ethyl acrylate may be varied over a wide range. In the event any interpolymer does not possess the desired degree of softness or tackiness, a tackifier such as rosin, rosin ester, "Zitro" (a chemically modified zinc rosinate), "Nevillac" (a phenol-modified coumarone-indene type resin produced by the Neville Co., Pittsburgh, Pa.), etc., may be added.

*Preparation of magnesium oxychloride cement floor*

A magnesium oxychloride cement floor was laid over a Portland cement base which had been set for a considerable time. The Portland cement base consisted of a 3:1 mix, i. e. 3 parts sand to 1 part cement.

The base was prepared as follows:

All loose particles were removed by means of a wire brush, chisel, etc. All grease and oil was removed from the surface by means of a volatile petroleum hydrocarbon solvent. If desired, muriatic acid may be used to further cleanse the base surface. Furthermore, if only a portion of the floor surface is to be resurfaced, a groove around the area to be resurfaced should be chiseled, and no attempt to featheredge should be made.

The prime coat was applied as follows:

The aqueous dispersion of methyl acrylate-ethyl acrylate synthetic elastomer, prepared as shown above, was brushed on the base. However, if desired, the dispersion may be sprayed on the base surface. A continuous film sufficient to uniformly coat the base was deposited. The coat was very thin, being about 1/64 inch in thickness. If desired, however, the thickness may be increased. Ordinarily a single coat is sufficient, but several coats may be applied. The prime coat when applied was a milky color, but upon drying for about 45 minutes, the color became transparent. The time of drying will vary with the choice of synthetic elastomer, thickness of the film, etc., but generally requires from about 15 minutes to about 45 minutes.

Application of wearing surface:

As soon as the prime coat had dried, a wearing surface of magnesium oxychloride cement was applied. It is not necessary, however, to immediately apply the wearing surface, as the prime coat after being applied may stand as long as a week prior to the application of the wearing surface without loss of adhesive strength.

The magnesium oxychloride cement comprised the following magnesium oxychloride mixture:

| | Parts by weight |
|---|---|
| Magnesium oxide | 20 |
| Crushed sand | 80 |
| CaHPO₄ (secondary calcium orthophosphate) | 2 |

The components were placed in a rotary mixer and a concentrated magnesium chloride solution was added while the mixture was being agitated. As is well known in the art, the concentration of the magnesium chloride solution must be such as to produce a gravity of at least 20° Baumé, preferably 22° Baumé, in order to produce a satisfactory magnesium oxychloride cement. The agitation was continued until a mortar of the desired consistency was formed. The mortar was then flowed to a depth of ½ inch over the entire base surface which had been treated with the prime coat as described above. The wearing surface was then smoothed down or "finished" by use of a trowel, straight-edge or other appropriate finishing tools. The wearing surface was then allowed to set for a period of from 4 to 6 hours at ordinary room temperature. If, however, the surface is to be subjected to heavy duty trucking, the wearing surface should be allowed to set in the neighborhood of 24 hours before use. The resulting floor upon setting was a strong magnesium oxychloride cementitious wearing surface securely bound to the base by means of a prime coat comprising a soft, petroleum insoluble synthetic elastomer.

Our invention is not limited to the above described base and/or magnesium oxychloride cement, or to the specific method of construction. Any other suitable base such as brick, metal, stone, wood, composition, etc. may be used as well as any other cementitious wearing surface of the magnesium oxychloride or Sorel type.

One of the important uses of magnesium oxychloride cement is in the repairing and resurfacing of Portland cement floors. The use of prime coat of this invention is contemplated wherever magnesium oxychloride cement is used as a wearing surface, whether it be to repair worn patches of a concrete floor, or whether the entire wearing surface is magnesium oxychloride cement.

What we claim is:

A cement floor, wall or the like comprised of a substantially continuous base surface, and a magnesium oxychloride cementitious wearing surface adhesively secured to said base surface by means of a synthetic elastomer, said elastomer comprising an interpolymer of methyl acrylate-ethyl acrylate.

RUSSELL H. FREDRICKSON.
HENRY N. STEPHENS.

REFERENCES CITED

The following references are of record in the file of this patent:

UNITED STATES PATENTS

| Number | Name | Date |
|---|---|---|
| 2,286,767 | Shutt | June 16, 1942 |
| 2,126,191 | Hubbell | Aug. 9, 1938 |
| 823,950 | Langguth | June 19, 1906 |
| 2,294,247 | Smith | Aug. 25, 1942 |

FOREIGN PATENTS

| Number | Country | Date |
|---|---|---|
| 388,158 | Great Britain | Feb. 23, 1933 |
| 523,349 | Great Britain | July 12, 1940 |